US012683327B2

(12) United States Patent
Masumoto

(10) Patent No.: US 12,683,327 B2
(45) Date of Patent: Jul. 14, 2026

(54) CONNECTOR

(71) Applicant: SUMITOMO WIRING SYSTEMS, LTD., Mie (JP)

(72) Inventor: Takuya Masumoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 359 days.

(21) Appl. No.: 18/434,184

(22) Filed: Feb. 6, 2024

(65) Prior Publication Data

US 2024/0291201 A1 Aug. 29, 2024

(30) Foreign Application Priority Data

Feb. 24, 2023 (JP) ................................ 2023-027283

(51) Int. Cl.
*H01R 13/629* (2006.01)

(52) U.S. Cl.
CPC . *H01R 13/62955* (2013.01); *H01R 13/62938* (2013.01)

(58) Field of Classification Search
None
See application file for complete search history.

(56) References Cited

U.S. PATENT DOCUMENTS

| | | | | |
|---|---|---|---|---|
| 7,255,581 | B2 * | 8/2007 | Yamaoka | H01R 13/62955 439/157 |
| 9,461,395 | B2 * | 10/2016 | Kataoka | H01R 13/502 |
| 11,128,091 | B2 * | 9/2021 | Kobayashi | H01R 13/62938 |
| 11,251,566 | B2 * | 2/2022 | Akagi | H01R 13/62938 |
| 11,296,459 | B2 * | 4/2022 | Akagi | H01R 13/62938 |
| 2003/0017733 | A1 | 1/2003 | Fujii | |
| 2006/0110960 | A1 * | 5/2006 | Yamaoka | H01R 13/62938 439/157 |
| 2017/0346225 | A1 * | 11/2017 | Kanda | H01R 13/62955 |
| 2020/0251856 | A1 | 8/2020 | Teramoto | |
| 2022/0320797 | A1 | 10/2022 | Hirota | |

FOREIGN PATENT DOCUMENTS

| | | | | |
|---|---|---|---|---|
| CN | 109638564 B | * 11/2021 | H01R 13/6295 |
| CN | 112003074 B | * 3/2022 | H01R 13/62938 |
| JP | 2021114418 A | * 8/2021 | |
| JP | 2022154811 A | * 10/2022 | H01R 13/62905 |

* cited by examiner

*Primary Examiner* — Tho D Ta
(74) *Attorney, Agent, or Firm* — Venjuris, P.C.

(57) ABSTRACT

A lever 40 has a plate-shaped cam plate portion 42 that is fitted to the partner connector 90, and progresses fitting with the partner connector 90. The cam plate portion 42 includes a locking portion 54 that protrudes from a first end portion 57 in a thickness direction and is locked to a housing 20 at the temporary lock position, and a hole-shaped hollowed portion 56, 56A, 56B, and 56C disposed at an intermediate portion in the thickness direction on an opposite side to the locking portion 54 with respect to the first end portion 57 in the thickness direction.

5 Claims, 14 Drawing Sheets

CONNECTOR

CROSS-REFERENCE TO RELATED APPLICATIONS

This application is based on and claims priority from Japanese Patent Application No. 2023-027283, filed on Feb. 24, 2023, with the Japan Patent Office, the disclosure of which is incorporated herein in its entirety by reference.

TECHNICAL FIELD

The present invention relates to a connector.

BACKGROUND

A connector disclosed in JP 2020-126714 A includes a housing and a lever, which is disposed so as to be rotatable between a temporary lock position (initial position) and a lock position (fitting complete position) with respect to the housing. The lever includes a plate-shaped cam plate portion (arm plate). The cam plate portion has a cam function for fitting with the partner connecter and promoting fitting with a partner connector in the process of rotation from the temporary lock position to the lock position. The cam plate portion includes, on the inner side of a U-shaped slit, a cantilever-shaped elastic piece, which can elastically deform in a thickness direction. The elastic piece is locked by the housing at the initial position and restricts rotation of the lever to the lock position. The means for holding the lever at the temporary lock position with respect to the housing is disclosed in JP 2003-036926 A and JP 2022-154811 A.

SUMMARY

In JP 2020-126714 A, for example, when the lever is in a separate state before being attached to the housing, if an object or the like is caught by the elastic piece and the elastic piece elastically deforms in a reverse direction unintentionally, an elastic force of the elastic piece may deteriorate. As a result, there is a risk that the elastic piece cannot appropriately exhibit the original lock function for locking the housing at the temporary lock position.

In view of this, an object of the present disclosure is to provide a connector capable of improving reliability in holding a lever at a temporary lock position with respect to a housing.

A connector according to the present disclosure is a connector including a housing that can be fitted to a partner connector, a lever disposed so as to be displaceable between a temporary lock position and a lock position with respect to the housing, and wherein the lever has a plate-shaped cam plate portion that is to engage with the partner connector, and is configured to promote fitting with the partner connector in a process of displacement from the temporary lock position to the lock position, and the cam plate portion includes a locking portion that protrudes from a first end portion in a thickness direction of the cam plate portion in the thickness direction and is locked by the housing at the temporary lock position, and a hole-shaped hollowed portion disposed on an opposite side to the locking portion with respect to the first end portion in the thickness direction, at an intermediate portion in the thickness direction.

According to the present disclosure, a connector capable of improving reliability in locking a lever at a temporary lock position with respect to a housing can be provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
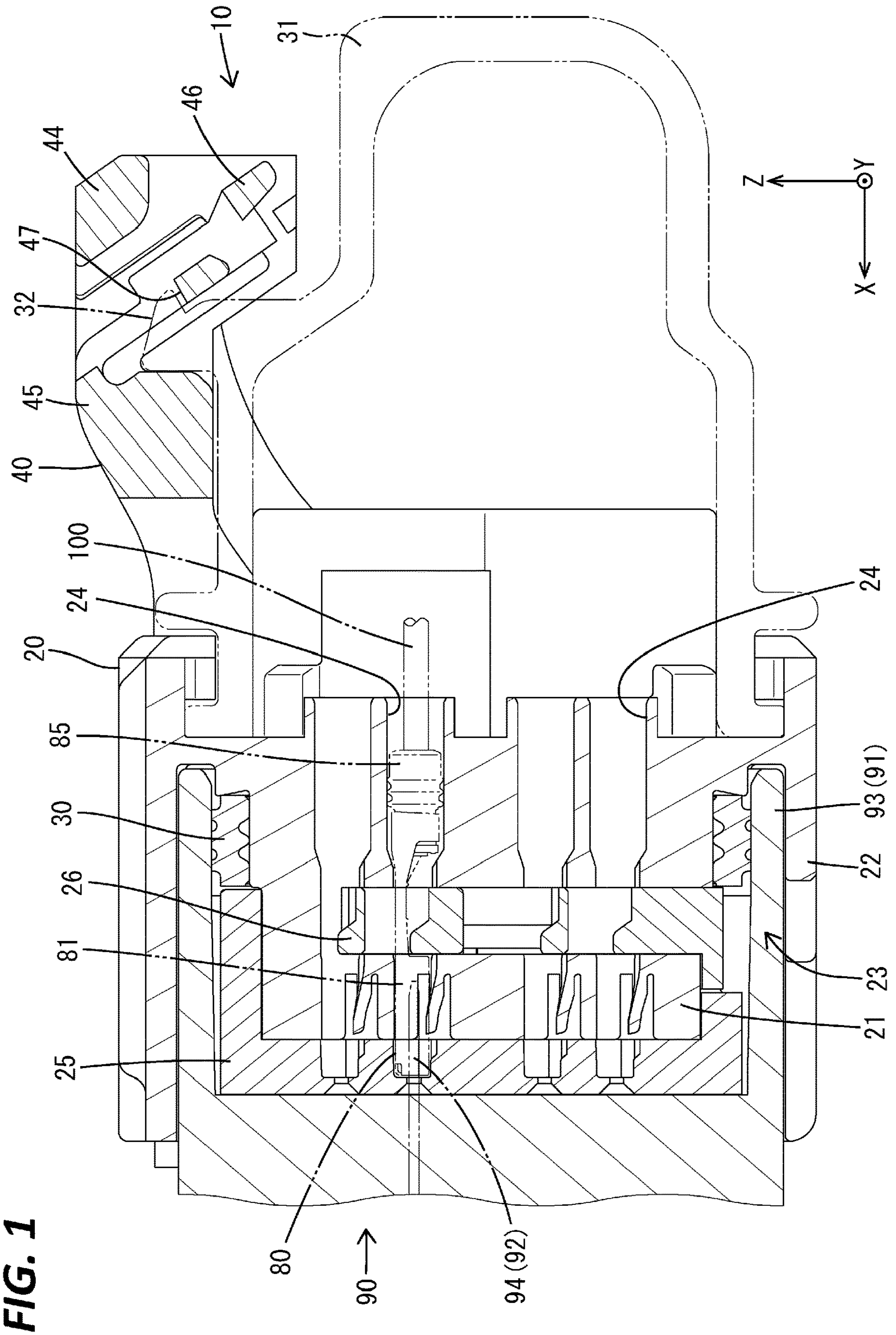
FIG. 1 is a lateral cross-sectional view showing a connector in a fitted state with a partner connector in a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENT OF DISCLOSURE

First, embodiments of the present disclosure will be listed and described.

(1) A connector according to the present disclosure includes a housing that can be fitted to a partner connector, and a lever disposed so as to be displaceable between a temporary lock position and a lock position with respect to the housing, and wherein the lever has a plate-shaped cam plate portion that is to engage with the partner connector, and is configured to promote fitting with the partner connector in a process of displacement from the temporary lock position to the lock position, and the cam plate portion includes a locking portion that protrudes from a first end portion in a thickness direction of the cam plate portion in the thickness direction and is locked by the housing at the temporary lock position, and a hole-shaped hollowed portion disposed on an opposite side to the locking portion with respect to the first end portion in the thickness direction, at an intermediate portion in the thickness direction.

With the above configuration, due to the first end portion in the thickness direction of the cam plate portion elastically deforming toward the hollowed portion, the locking portion can be locked to the housing, and the lever can be locked at the temporary lock position. Since the hollowed portion has a closed loop-shaped cross section, a case in which the first end portion in the thickness direction of the cam plate portion elastically deforms excessively can be avoided. Accordingly, the above configuration can improve the reliability in holding the lever at the temporary lock position with respect to the housing. Note that a hole shape means a hole having a closed loop-shaped cross section that is closed in a peripheral direction.

(2) It is preferable that the hollowed portion extends in the intermediate portion in the thickness direction, and a first end in an extending direction of the hollowed portion is open in a thickness surface of an outer periphery of the cam plate portion.

According to the above configuration, when the hollowed portion is formed using a mold, the first end in the extending direction that is open in the thickness surface of the outer periphery of the cam plate portion serves as the molding opening, from which the mold can be pulled out. Therefore, with the above configuration, the hollowed portion can be easily formed through molding.

(3) It is preferable that the lever includes a lock arm that is to be locked by the housing or the partner connector at the lock position, and the lock arm extends in a direction parallel to the extending direction of the hollowed portion.

With the above configuration, the lock arm can be formed using a mold that is pulled out in the same direction as the mold for forming the hollowed portion, preferably, the same mold as the mold for forming the hollowed portion. Accordingly, with the above configuration, the lever can be formed without using a complex slide mold.

(4) It is preferable the cam plate portion includes a cam groove that extends from an inlet that is open in the thickness surface of the outer periphery of the cam plate portion, the cam groove is configured to receive a cam pin of the partner connector from the inlet at the temporary lock position, and cause the cam pin to fit to a groove surface in the process of displacement, the first end portion in the thickness direction of the cam plate portion defines the inlet side of the cam groove, and a second end in the extending direction of the hollowed portion is open on the inlet side of the groove surface of the cam groove.

With the above configuration, since the first end portion in the thickness direction of the cam plate portion where the locking portion protrudes defines the inlet side of the cam groove, the elastic force of the first end portion can be easily adjusted using the cam groove. Also, a second end in the extending direction of the hollowed portion is open on the inlet side of the groove surface of the cam groove, and thus the rigidity of the groove surface can be decreased, and the stability (steadiness) can be improved when the cam pin is received on the inlet side of the cam groove.

(5) It is preferable a dimension in a width direction orthogonal to the extending direction of the hollowed portion and the thickness direction is larger on the second end side in the extending direction than on the first end side in the extending direction.

With the above configuration, when the hollowed portion is formed through molding, the mold can be easily pulled out from the first end in the extending direction that is open in the thickness surface of the outer periphery of the cam plate portion, thus making it possible to improve the mold releasing property. Also, with the above configuration, the hollowed portion can be accurately formed.

Details of Embodiments of the Present Disclosure

Specific examples of the present disclosure will be described below with reference to the drawings. Note that the present invention is not limited to these examples, but rather is indicated by the scope of the claims, and is intended to include all modifications within the scope and meaning equivalent to the scope of the claims.

First Embodiment

As shown in FIG. 1, a connector 10 according to a first embodiment includes a housing 20, a lever 40 supported so as to be rotatable between a temporary lock position and a lock position with respect to the housing 20, and a plurality of terminal fittings 80 housed in the housing 20. The housing 20 can fit to a partner connector 90. Note that, in the following description, with respect to a front-rear direction, a side on which surfaces of the connector 10 and the partner connector 90 face each other at the start of fitting is a front side. A left-right direction is based on the left-right direction shown in FIGS. 3 to 5. An up-down direction is based on the up-down direction shown in FIGS. 1 to 5. In the connector 10, the reference sign X is on the front side, the reference sign Y is on the right side, and the reference sign Z is on the upper side. These directions do not necessarily match the directions when the connector 10 is mounted in a vehicle or the like (not shown).

Partner Connector 90

Figure 2:
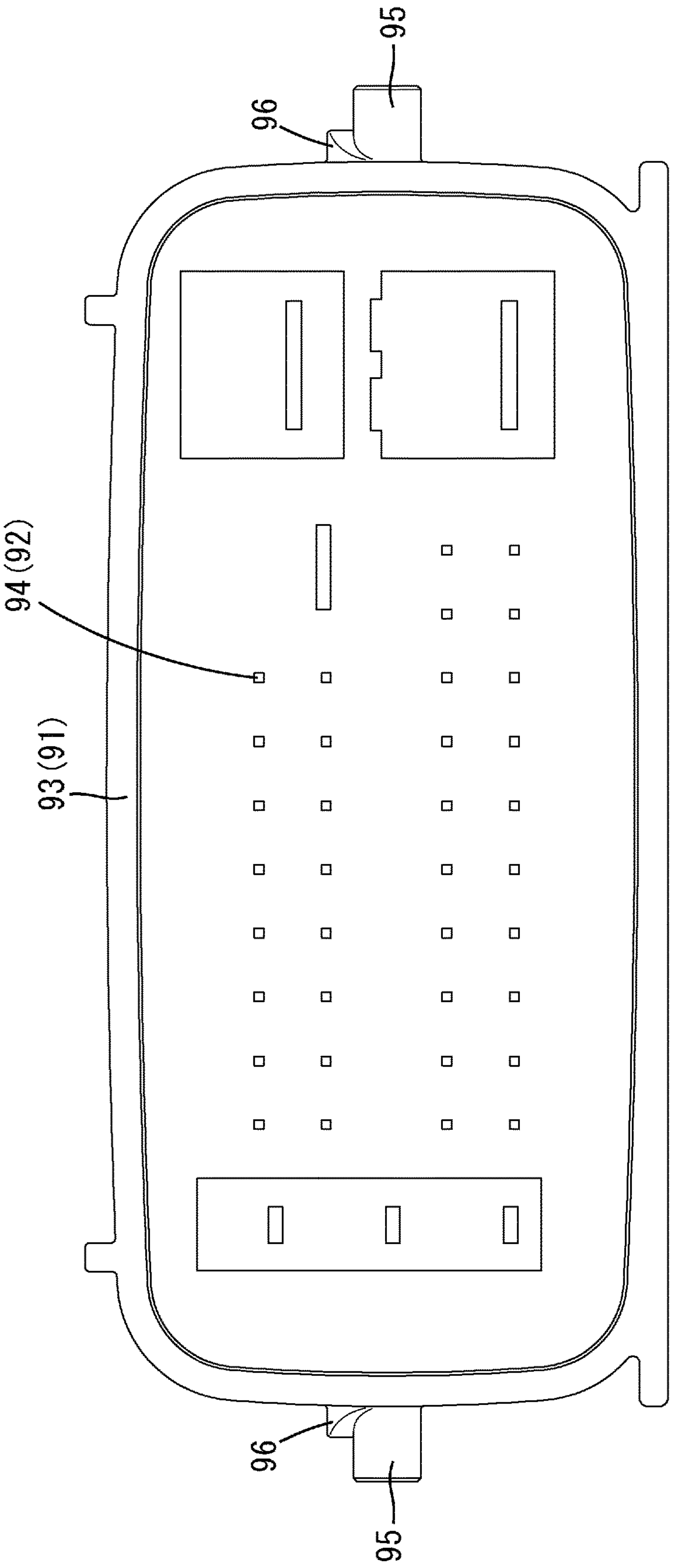
FIG. 2 is a front view of a partner housing.

The partner connector 90 includes a partner housing 91 made of a synthetic resin, and a plurality of partner terminal fittings 92 made of a conductive metal and that are to be attached to the partner housing 91. As shown in FIGS. 1 and 2, the partner housing 91 includes a cylindrical hood portion 93 that is open forward. The partner terminal fittings 92 each have a tub 94 protruding on the inner side of the hood portion 93.

As shown in FIG. 2, cam pins 95 respectively protrude from outer surfaces of left and right side walls of the hood portion 93. The cam pins 95 each have a cylindrical shape, and engage with a groove surface of a cam groove 49 (described later) of the lever 40 (see FIG. 12). Releasing portions 96 respectively protrude on the outer surfaces of the left and right side walls of the hood portion 93. The releasing portions 96 each have a rib-like shape that is lower than the cam pins 95 and are coupled with base end portions of the cam pins 95. The releasing portions 96 come into contact with locking portions 54 (described later) of the lever 40 to release a locked state of the locking portions 54.

Housing 20, Terminal Fittings 80, Etc.

Figure 3:
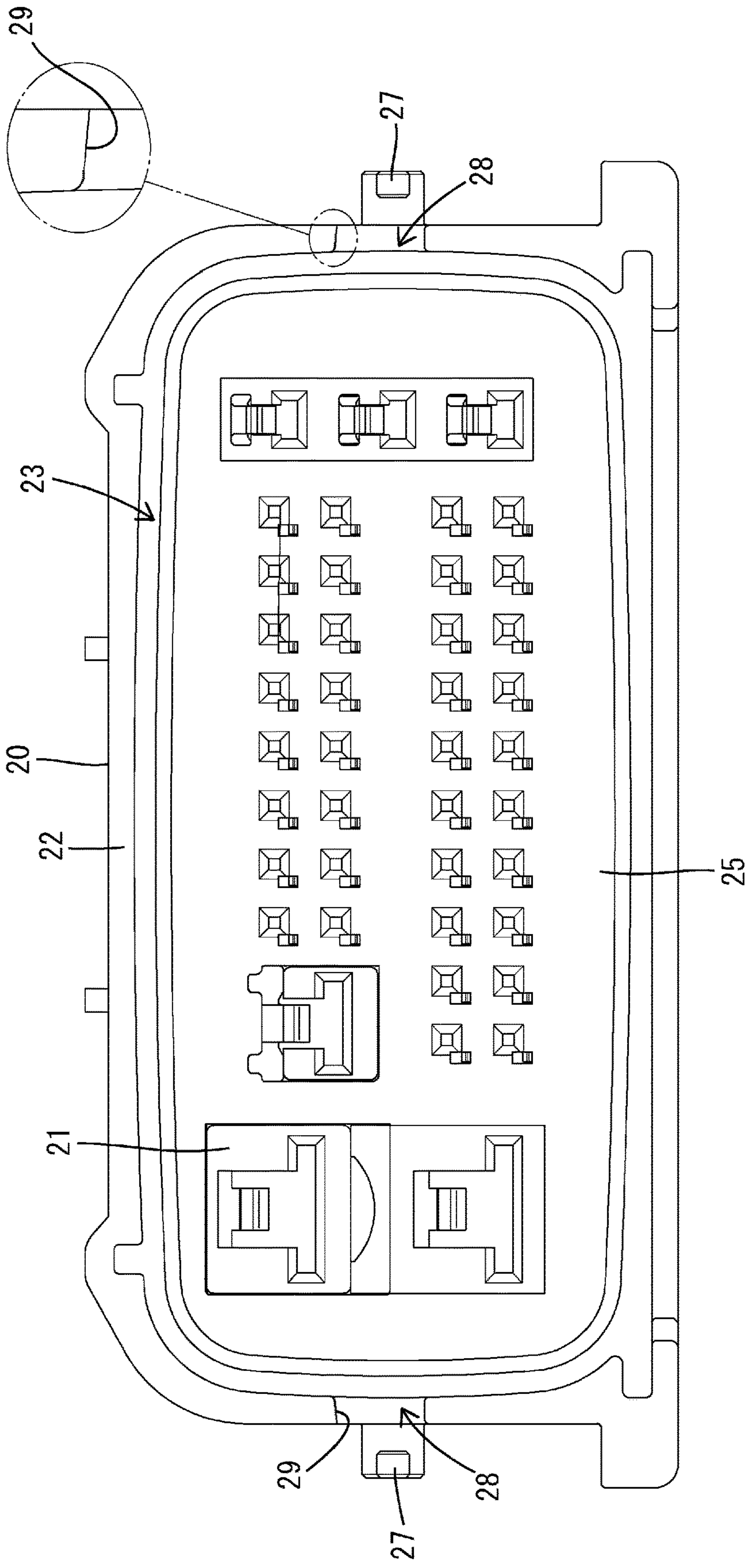
FIG. 3 is a front view of a housing.

The housing 20 is made of a synthetic resin, and includes a housing body 21, and a fitting cylindrical portion 22 that surrounds an outer periphery of the housing body 21, as shown in FIGS. 1 and 3. A fitting space 23 is formed between the housing body 21 and the fitting cylindrical portion 22.

As shown in FIG. 1, the hood portion 93 is inserted and fitted into the fitting space 23 of the housing 20. A seal ring 30 is attached to the outer peripheral surface of the housing body 21. The seal ring 30 is disposed between the housing body 21 and the hood portion 93 in a compressed state. In this manner, the connector 10 and the partner connector 90 are sealed in a liquid-tight manner.

The housing body 21 includes a plurality of cavities 24. The terminal fittings 80 are respectively inserted and housed in the cavities 24. The terminal fittings 80 are restricted from coming out forward by a front mask 25 attached on a front surface side of the housing body 21. Also, the terminal fittings 80 are restricted from coming out rearward by a retainer 26 attached on a side surface side of the housing body 21.

Terminal fittings 80 are made of a conductive metal, and each include a connection portion 81 to which a tab 94 of a partner terminal fitting 92 can be inserted and connected. The terminal fittings 80 are crimped and electrically connected to core wires of wires 100 in the rear of the connection portions 81. Also, the terminal fittings 80 are crimped to rubber plugs 85 fitted to the wires 100. The rubber plugs 85 are inserted into a cavity 24 together with the terminal fittings 80, and seal between the wires 100 and the housing 20 in a liquid-tight manner.

Figure 11:
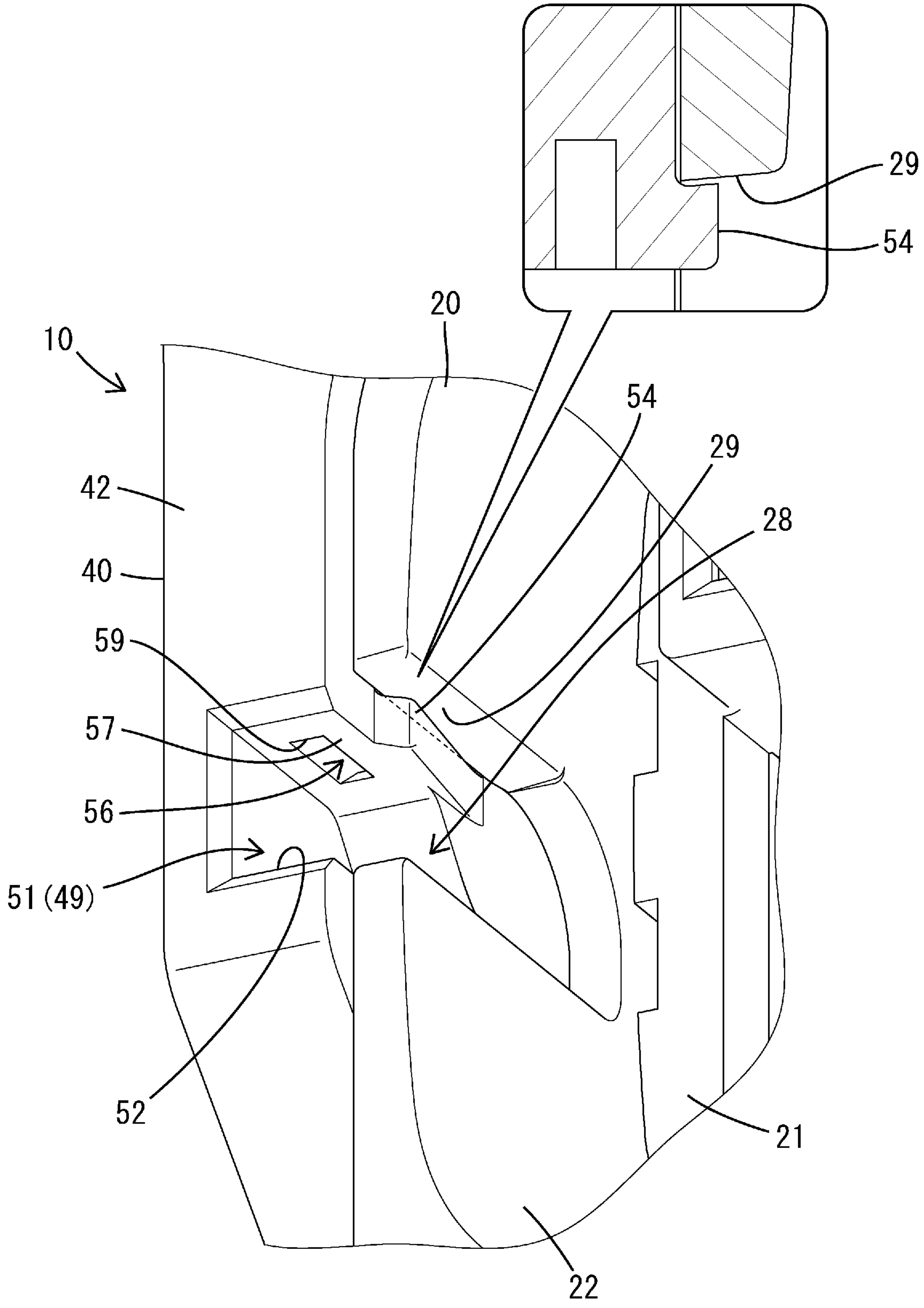
FIG. 11 is a partial enlarged perspective view showing a state in which the lever is locked at a temporary lock position in the housing.

As shown in FIG. 3, shaft portions 27 respectively protrude from the outer surfaces of the left and right side walls of the fitting cylindrical portion 22. Each shaft portion 27 has a cylindrical shape and rotatably supports the lever 40. Further, the fitting cylindrical portion 22 has insertion portions 28 respectively on the left and right side walls. As shown in FIG. 11, each insertion portion 28 has a groove-like (recessed) shape extending in the front-rear direction and is open on the front end of each side wall. Each insertion portion 28 has a locked portion 29 to which a locking portion 54 (described later) of the lever 40 can be locked on the upper groove surface. As shown in FIG. 3, the locked portion 29 is slightly inclined upward toward the center in the left and right direction of the housing body 21 with respect to the left-right direction.

As shown in FIG. 1, the housing 20 has a wire cover 31 that is to be attached to the fitting cylindrical portion 22 so as to cover a rear surface of the housing body 21. Although not shown in detail, the wire cover 31 has a cap-like shape, houses the wires 100 that extend from the housing body 21, and defines a direction in which the wires 100 are drawn out to the outside. The wire cover 31 has a lock protrusion 32 that locks the lever 40 that has reached the lock position.

Lever 40

Figure 4:
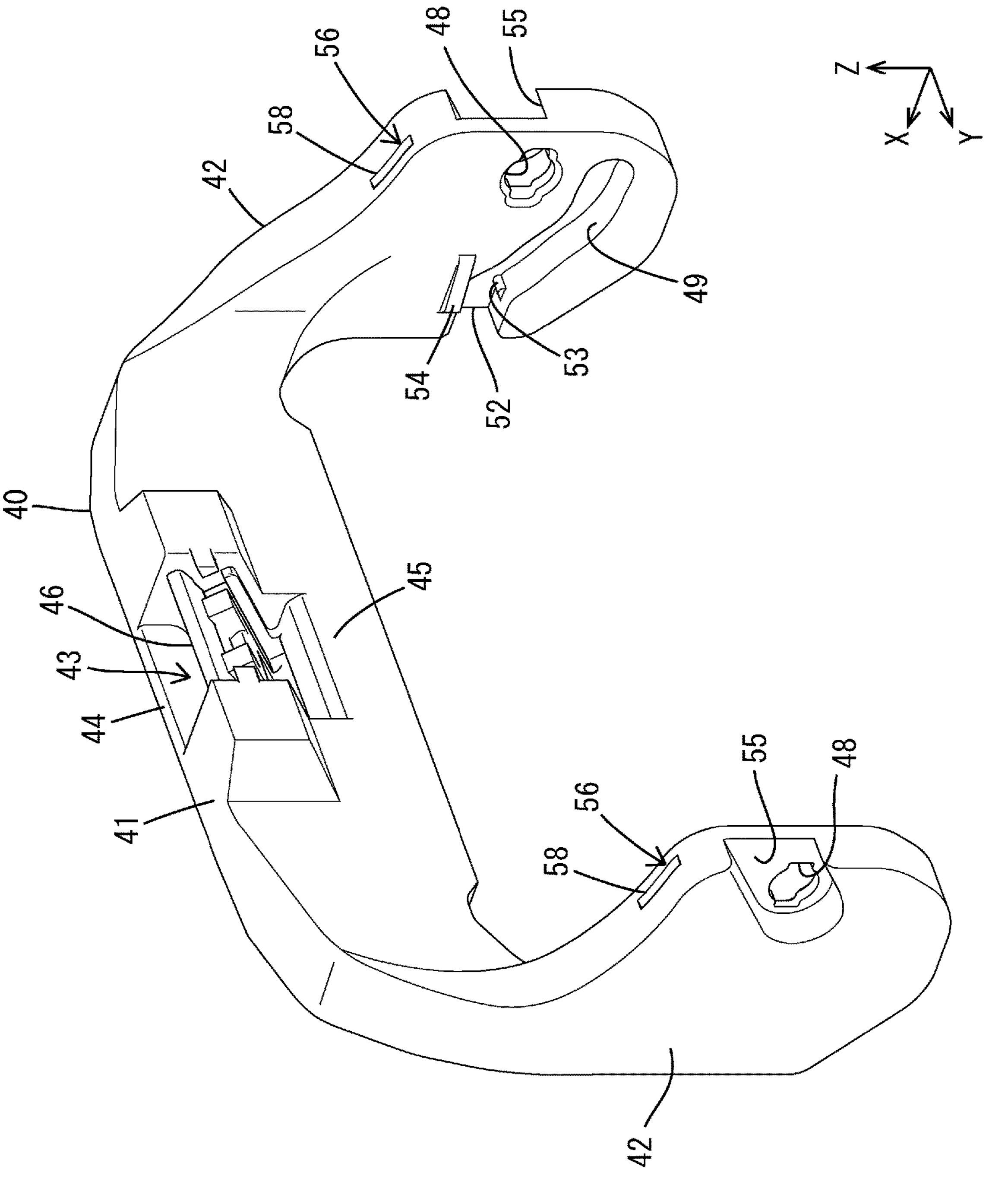
FIG. 4 is a perspective view of a lever.
Figure 5:
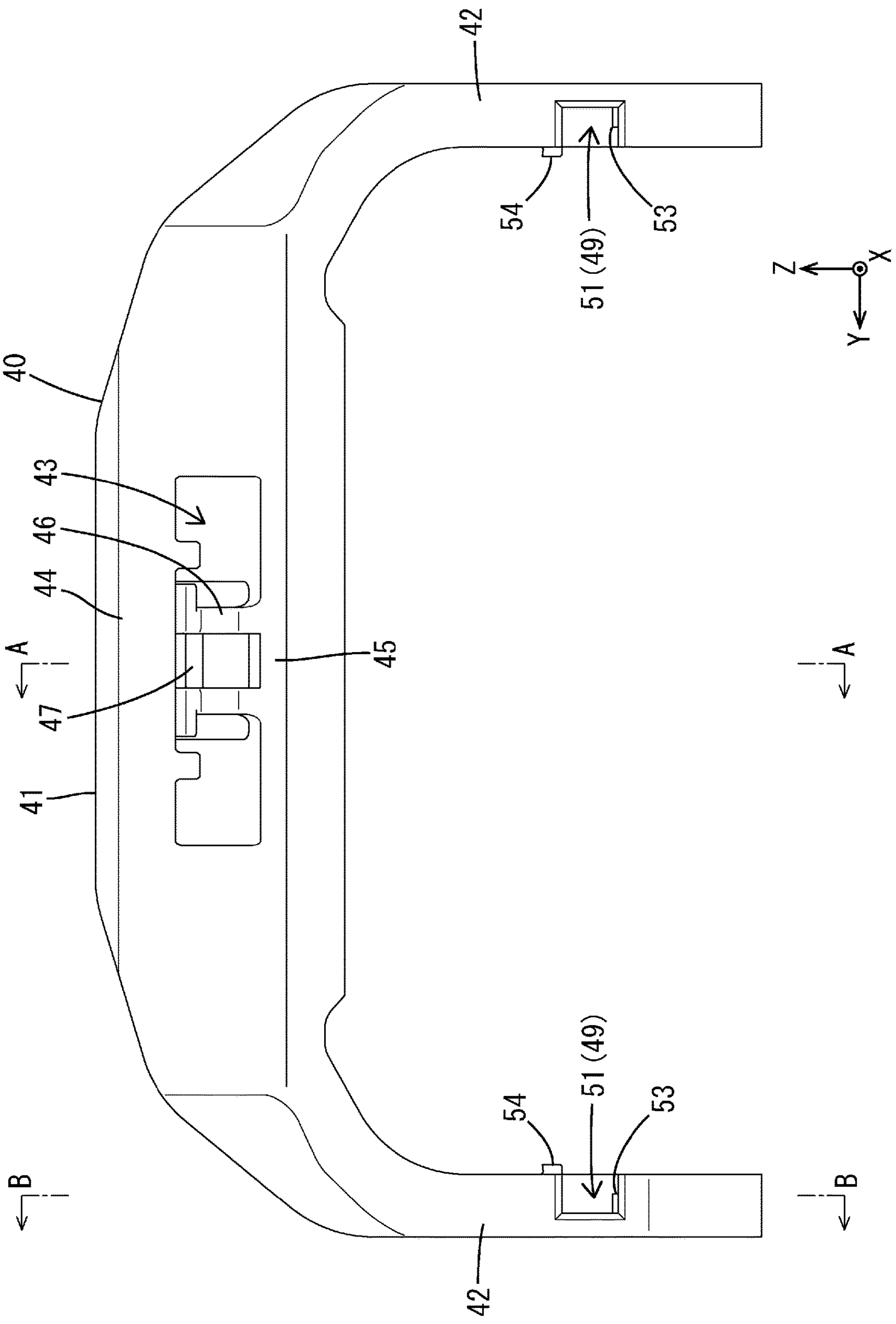
FIG. 5 is a front view of the lever.

The lever 40 is made of a synthetic resin and includes a coupling portion 41 extending in the left-right direction, and the cam plate portions 42 that respectively protrude from the left and right end portions of the coupling portion 41 as shown in FIGS. 4 and 5, and has a bridge-like plate shape on the whole. Note that, in the following description of the structure of the lever 40, the states of the FIGS. 4 and 5 that serve as references for the directions correspond to a state in which the lever 40 is positioned at the temporary lock position with respect to the housing 20.

Figure 7:
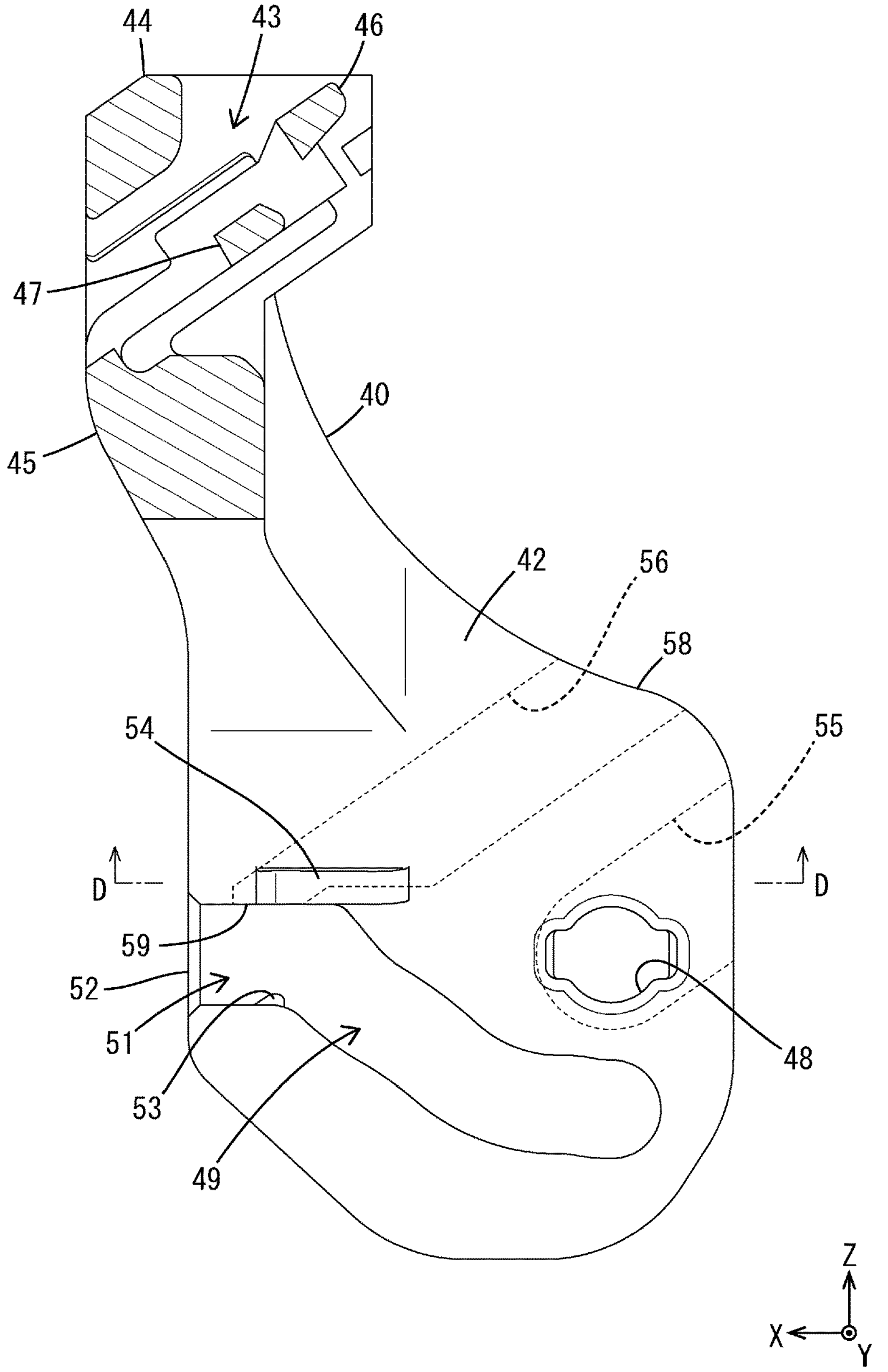
FIG. 7 is a cross-sectional view taken along line A-A in FIG. 5.

The coupling portion 41 is positioned with the plate surface facing in the front-rear direction. As shown in FIGS. 4 and 7, the coupling portion 41 has a lock space 43 that extends through in the front-rear direction, an upper portion 44 and a lower portion 45 that are vertically partitioned in the lock space 43, and a lock arm 46 that inclines upward and extends rearward from the front end of the lower portion 45 at the center portion in the left-right direction thereof. The lock arm 46 can elastically deform using a front end portion on the lower portion 45 side as a fulcrum. As shown in FIG. 7, the lock arm 46 includes a lock surface 47 disposed facing forward and diagonally downward. After the lock arm 46 elastically deforms, as shown in FIG. 1, the lock surface 47 of the lock arm 46 is disposed opposing the lock protrusion 32 so as to be capable of being locked to the lock protrusion 32, and thus the lever 40 is held at the lock position with respect to the housing 20.

As shown in FIGS. 4 and 5, the cam plate portions 42 are disposed with the plate surfaces facing in the left-right direction. Note that the thickness direction of the cam plate portions 42 (described later) corresponds to the left-right direction (the left-right direction of FIGS. 4 and 5) in the first embodiment. As shown in FIG. 7, the cam plate portions 42 each include a bearing portion 48 that extends through in the left-right direction at a portion near the rear end. The lever 40 is capable of rotating between the temporary lock position and a lock position about the shaft portion 27 that is fitted with the bearing portion 48. The lever 40 is disposed in a stand-up orientation with the coupling portion 41 located on the upper end at the temporary lock position, and in a tilted orientation with the coupling portion 41 located rearward at the lock position, as shown in FIG. 1.

Figure 12:
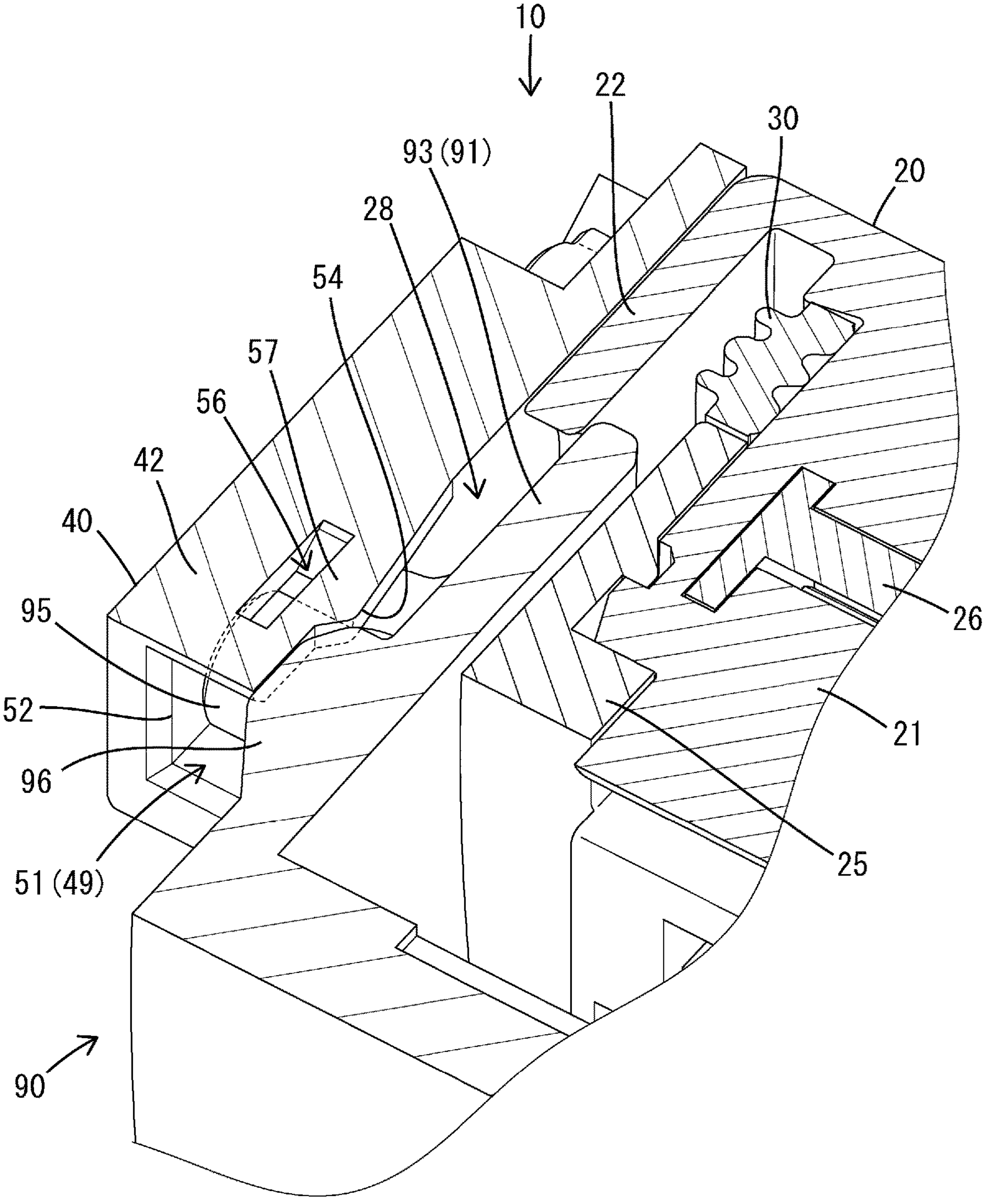
FIG. 12 is a partial enlarged perspective cross-sectional view showing a state in which a cam pin enters an introduction portion of a cam groove at a time of starting fitting with the partner housing, and a releasing portion of the partner housing is in contact with the locking portion.

As shown in FIG. 4, the cam plate portions 42 each include a cam groove 49 that bends and extends forward from a position near the bearing portion 48 in an inner surface (a surface on the one end side in the thickness direction) that faces toward the center in the left-right direction. The cam grooves 49 each have a recessed shape having a bottomed cross-section. As shown in FIG. 11, the cam grooves 49 each have an introduction portion 51 that is short and extends in the front-rear direction at the front end portion. Each introduction portion 51 includes an inlet 52 that is open in the thickness surface at the outer peripheral front end of each cam plate portion 42. Note that "the inlet 52 side" includes the introduction portion 51. As shown in FIG. 12, each cam pin 95 is introduced from the inlet 52 to the introduction portion 51, and slides on the groove surface of the cam groove 49 through the rotation of the lever 40. As shown in FIGS. 4 and 5, each introduction portion 51 includes a protrusion 53 on a lower groove surface. Although not shown in the drawing, each protrusion 53 comes in contact with the cam pin 95 introduced into the introduction portion 51 and temporarily restricts movement of the cam pin 95.

Figure 6:
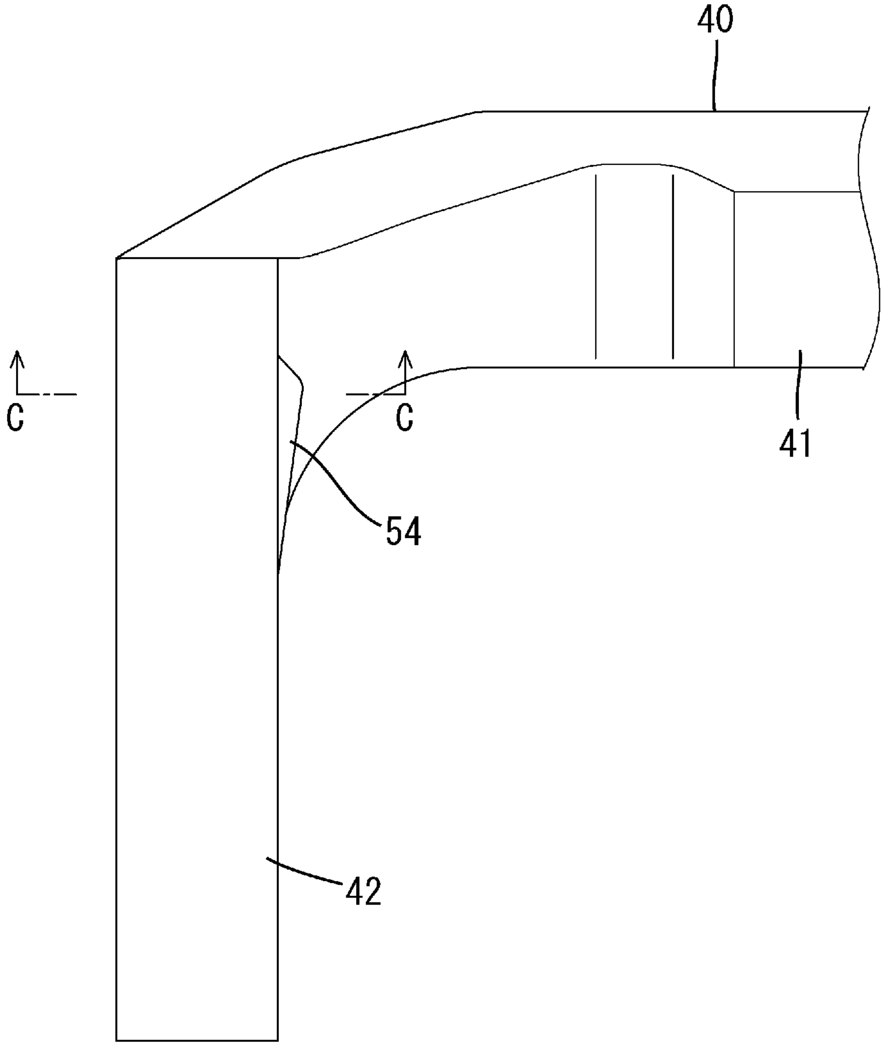
FIG. 6 is a bottom view of an end portion of the lever.
Figure 9:
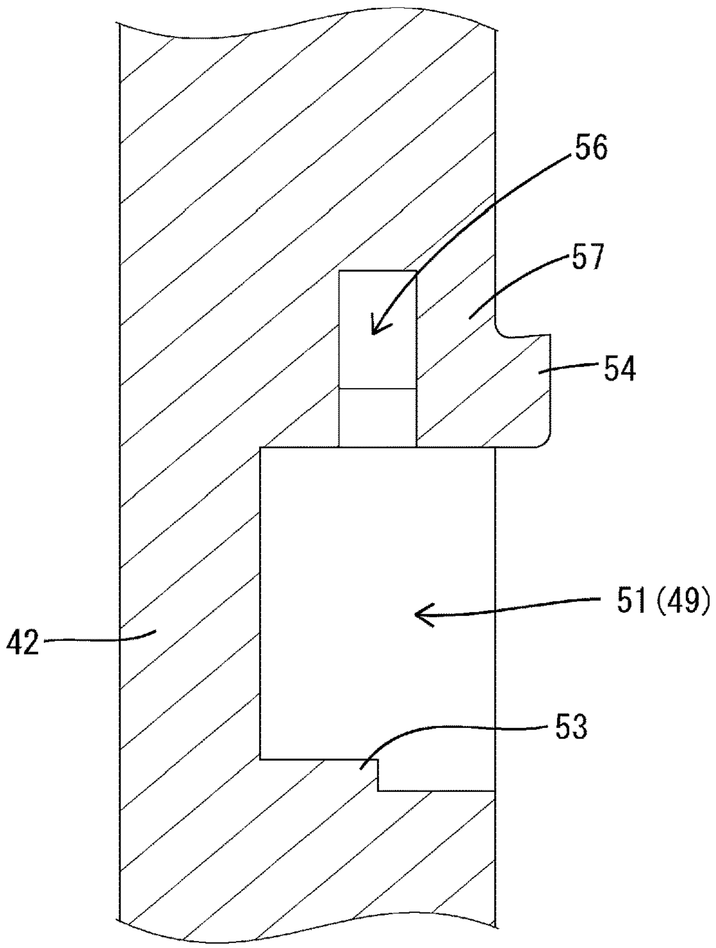
FIG. 9 is a cross-sectional view taken along line C-C in FIG. 6.
Figure 10:
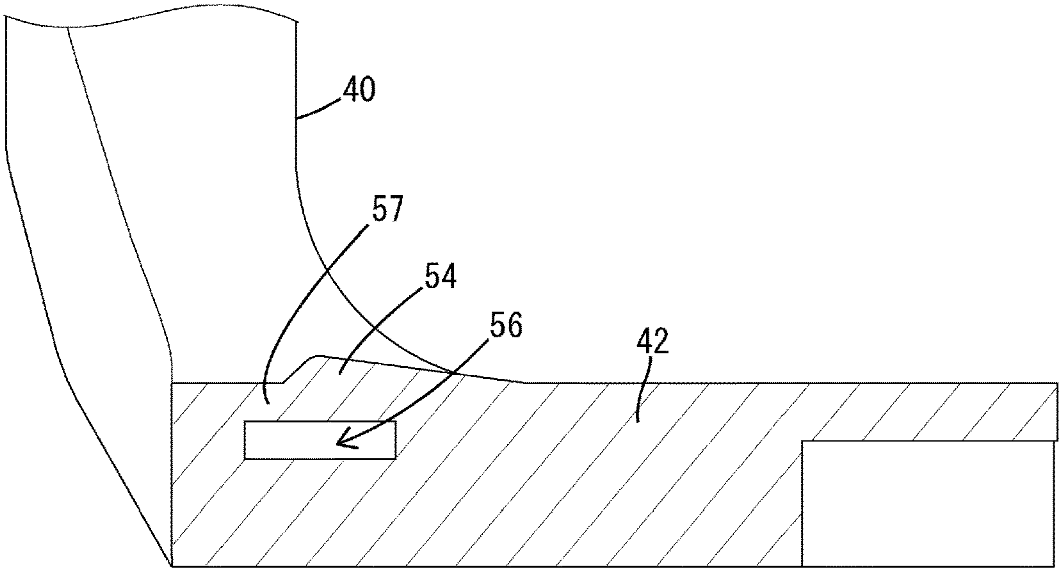
FIG. 10 is a cross-sectional view taken along line D-D in FIG. 7.

As shown in FIG. 7, a locking portion 54 protrudes from the inner surface of each cam plate portion 42. Each locking portion 54 has a rib-like shape extending in the front-rear direction, and formed along an upper edge of the introduction portion 51 near the inlet 52. As shown in FIGS. 6 and 10, the thickness (the thickness in the thickness direction) of each locking portion 54 increases toward the front end. As shown in FIG. 9, the upper surface of each locking portion 54 has an inverse-tapered shape in the left-right direction, and is slightly inclined upward toward the leading end in the protruding direction (the thickness direction of the cam plate portions 42). The upper surface of each locking portion 54 is disposed so as to be capable of being locked to the locked portion 29 of the insertion portion 28 in an opposing manner and along the direction in which the locked portion 29 is inclined (see FIG. 11). In this manner, the locked state of the locking portion 54 and the locked portion 29 can be stably maintained.

As shown in FIG. 4, the cam plate portions 42 each include a recess 55 for releasing the leading end portion of the shaft portion 27 in the outer surface (the surface on the other end side in the thickness direction) that faces outward in the left-right direction. Each recess 55 is inclined upward and extends rearward from the bearing portion 48 side, and is open in the thickness surface of the outer peripheral rear end of the cam plate portion 42.

Each cam plate portion 42 includes a hole-shaped hollowed portion 56 in the intermediate portion in the thickness direction thereof. As shown in FIGS. 10 and 11, each hollowed portion 56 is disposed at a position on an opposite side to the locking portion 54 with respect to the thickness direction with an end portion (an end portion on the inner surface side of the cam plate portions 42 and hereinafter referred to as "first end portion 57") on one end side in the thickness direction interposed therebetween. That is, the first end portion 57 defines (closes) one end side in the thickness direction of the hollowed portion 56. Each locking portion 54 protrudes in the thickness direction (toward the center in the left-right direction of the lever 40) from the first end portion 57. When each locking portion 54 comes into contact with the locked portion 29, the first end portion 57 elastically deforms toward the hollowed portion 56, and the hole diameter in the thickness direction of the hollowed portion 56 is reduced.

Figure 8:
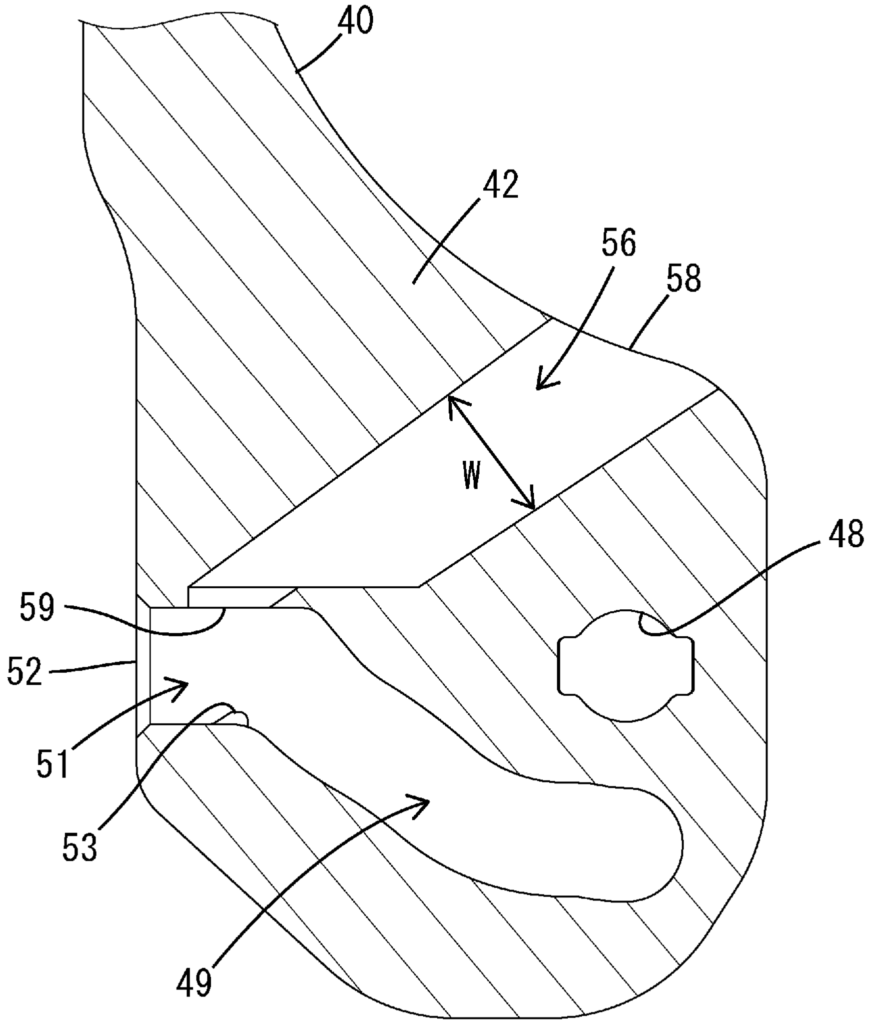
FIG. 8 is a cross-sectional view taken along line B-B in FIG. 5.

As shown in FIG. 10, each hollowed portion 56 has a cross section having a closed loop shape elongated in the front-rear direction at an intermediate portion that is on the slightly inner side in the thickness direction of the cam plate portion 42. As shown in FIGS. 7 and 8, each hollowed portion 56 extends over the intermediate portion in the thickness direction of the cam plate portion 42 along the plate surface of the cam plate portion 42, with a first end 58 open in the thickness surface in the outer peripheral rear end of the cam plate portion 42, and a second end 59 open in the groove surface (the upper groove surface) of the introduction portion 51 of the cam groove 49. The hollowed portion 56 is on the whole, inclined upward and extends rearward at the intermediate portion in the thickness direction of the cam plate portion 42 from the second end 59 to the first end 58. The hollowed portion 56 extends in the direction parallel to a direction in which the lock arm 46 is formed. The hollowed portion 56 also extends in the direction parallel to a direction in which the recess 55 is formed.

As shown in FIGS. 7 and 8, in each hollowed portion 56, with respect to the dimension in the width direction that is orthogonal to the thickness direction and the extending direction (hereinafter referred to as "the width dimension"; see the reference sign W in FIG. 8), the width dimension on the first end 58 side is larger than the width dimension on the second end 59 side. Specifically, the hollowed portion 56 extends with a constant width dimension in parallel with the recess 55 from the first end 58 in the extending direction to a position where the hollowed portion 56 overlaps with the locking portion 54 in the thickness direction, and the width dimension is reduced at a portion open in the groove surface of the introduction portion 51 of the cam groove 49.

Operation of Connector 10

The lever 40 is formed using a mold (not shown). At this time, the lock arm 46, the hollowed portions 56, and the recesses 55 are formed using molds that are configured to be removed in a diagonally upward direction toward the rear side, preferably, the same mold. With respect to the hollowed portions 56, the first end 58 that is open in the thickness surface in the outer peripheral rear end of the cam plate portion 42 is a mold opening, and the mold can be pulled out from the first end 58. Accordingly, a complex slide structure is not required when forming the hollowed portions 56.

As shown in FIG. 11, the lever 40 is held at the temporary lock position with respect to the housing 20 as a result of the locking portions 54 being locked at the locked portions 29 of the housing 20. At this time, the introduction portions 51 of the cam grooves 49 of the lever 40 become continuous with the insertion portions 28 of the housing 20, and the locking portions 54 enter the insertion portions 28.

In this state, the hood portion 93 is fitted to the fitting space 23 of the housing 20. As shown in FIG. 12, at the start of fitting, the cam pins 95 are respectively inserted into the insertion portions 28 and the introduction portions 51. Specifically, the base end portions of the cam pins 95 are respectively inserted into the insertion portions 28, and the leading end portions of the cam pins 95 are respectively inserted into the introduction portions 51 in the fitted state.

The peripheral surfaces of the leading end portions of the cam pins 95 are interposed between the upper and lower groove surfaces of the introduction portions 51. Here, due to the openings in the hollowed portions 56, the rigidity (hardness) of the groove surfaces on the upper side of the introduction portions 51 is decreased. And thus, the cam pins 95 can be prevented from rigidly coming into contact with the upper groove surfaces of the introduction portions 51, and can be steadily and stably inserted into the introduction portions 51.

While the base end portions of the cam pins 95 are inserted into the insertion portions 28, the releasing portions 96 that are continuous with the base ends of the cam pins 95 are also inserted into the insertion portions 28, and come into contact with the locking portions 54. The first end portions 57 are pressed by the insertion portions 28 and are elastically deformed toward the hollowed portions 56 (outward in the left-right direction). The locking portions 54 are displaced toward the hollowed portions 56 together with the first end portions 57 to release the locked state of the locking portions 54 and the locked portions 29.

From the above state, the lever 40 is rotated toward the lock position. In the process of the rotation, the cam pins 95 slide on the groove surfaces of the cam grooves 49, and the hood portion 93 is deeply inserted into the fitting space 23 of the housing 20. When the lever 40 reaches the lock position, the lock arm 46 elastically locks the lock protrusion 32, the rotation of the lever 40 with respect to the housing 20 is restricted, and at the same time, the housing 20 is held by the partner connector 90 in the fitted state. The cam pins 95 reach the back end side (the opposite side to the inlets 52) of the cam grooves 49. The terminal fittings 80 are electrically connected to the partner terminal fittings 92.

According to the first embodiment, the lever 40 and the locking portions 54 are displaced toward the hollowed portions 56 to release the locked state of the locking portions 54 and the locked portions 29, and the lever 40 becomes capable of rotating from the temporary lock position to the lock position. The hollowed portions 56 each have a hole shape (a cross-sectional shape closed in the form of a loop in the peripheral direction) at intermediate portions in the thickness direction of the cam plate portions 42. Accordingly, the locking portions 54 and the first end portions 57 are unlikely to catch on foreign matter and the like, and thus a case where the first end portions 57 elastically deform excessively can be avoided. Accordingly, with the configuration of the first embodiment, the reliability in holding the lever 40 at the temporary lock position with respect to the housing 20 can be improved.

Further, the first ends 58 of the hollowed portions 56 are open in the thickness surfaces in the outer peripheral rear edges of the cam plate portions 42, and the mold can be pulled out from the first ends 58 using the first ends 58 as the opening for unmolding. Specifically, since the hollowed portions 56 extend in the same direction as the direction in which the mold for forming the lock arm 46 is pulled out, no complex slide mold needs to be used when forming the hollowed portions 56.

Also, the first end portions 57 where the locking portions 54 protrude define regions on the inlet 54 side of the cam grooves 49, and thus the elastic force of the first end portions 57 can be readily adjusted. Further, since the second ends 59 in the extending direction of the hollowed portions 56 are open in the groove surfaces of the introduction portions 51 of the cam grooves 49, the rigidity of the groove surfaces can be decreased, and thus the stability (steadiness) of the cam pins 95 disposed at the introduction portions 51 can be improved.

Further, the width dimension on the first end 58 side in the extending direction of the hollowed portions 56 is larger than the width dimension on the second end 59 side, and thus the mold can be easily pulled out from the first ends 58 in the extending direction, making it possible to improve the mold releasing property.

Further, the hollowed portions 56 each have a closed loop-like cross sectional shape at the intermediate portion in the thickness direction of the cam plate portions 42, and thus, the width dimension of the hollowed portions 56 can be easily changed within the range of the cam plate portions 42, making it possible to increase the degree of freedom in shape as shown in the second to fourth embodiments described below.

Second Embodiment

Figure 13:
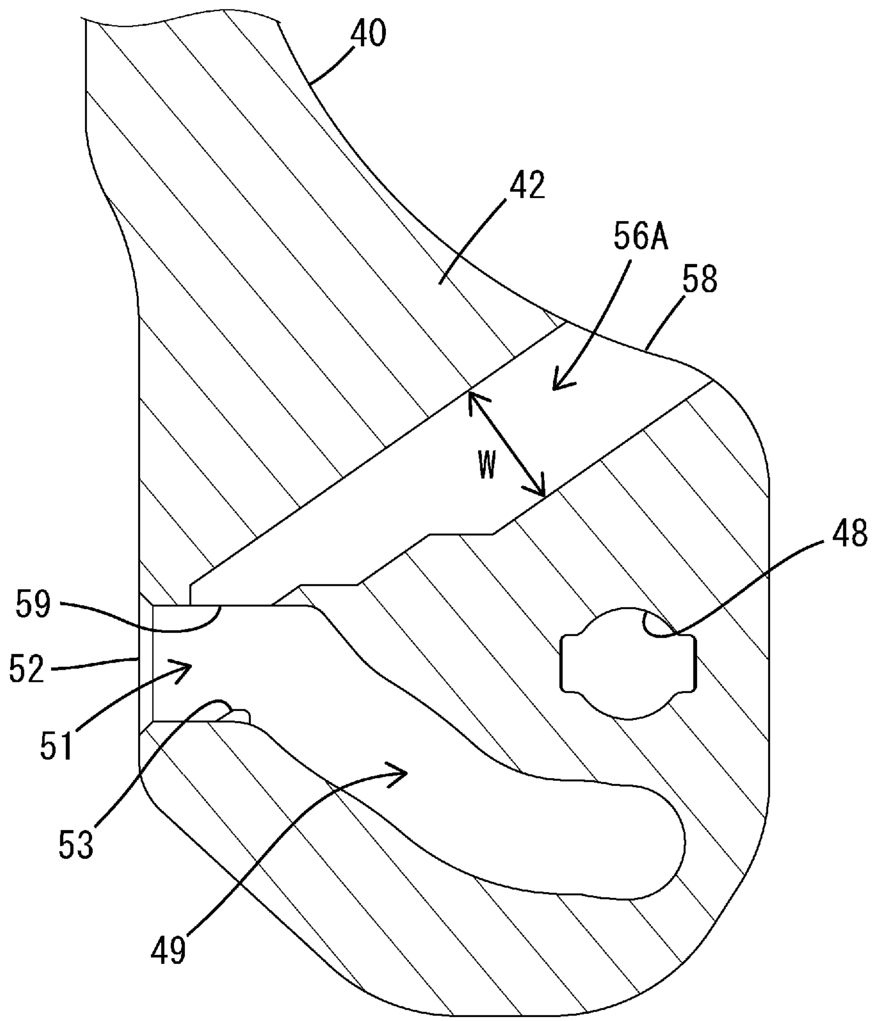
FIG. 13 is a view corresponding to FIG. 8 in a second embodiment.

As shown in FIG. 13, the shape of hollowed portions 56A of the lever 40 of the second embodiment is different from the first embodiment. Other configurations are similar to the first embodiment.

The width dimension (reference sign W in FIG. 13) of each hollowed portion 56A increases in multiple steps (in the case of FIG. 13, 2 steps) as proceeding from the second end 59 to the first end 58 in the extending direction. The first end 58 in the extending direction of each hollowed portion 56A is open in the thickness surface in the outer peripheral rear end of the cam plate portion 42 and may serve as the molding opening. The hollowed portions 56A are formed by a mold that is pulled out from the first ends 58. Accordingly, with the configuration of the second embodiment, the mold for forming the hollowed portions 56A can be increased in the width dimension in a stepped manner, and the strength of the mold can be easily ensured.

Third Embodiment

Figure 14:
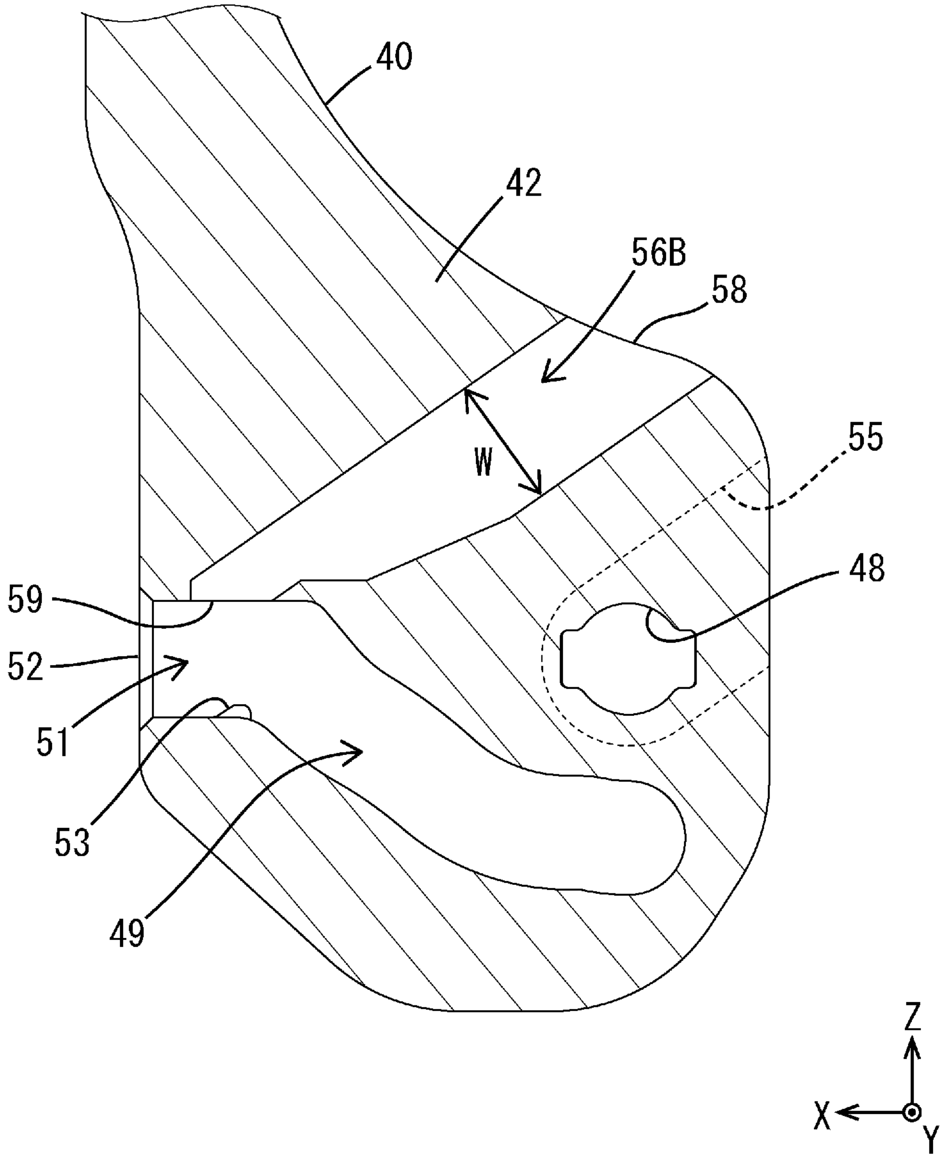
FIG. 14 is a view corresponding to FIG. 8 in a third embodiment.

As shown in FIG. 14, the shape of hollowed portions 56B of the lever 40 in the third embodiment is different from that of the first embodiment. Other configurations are similar to the first embodiment.

The width dimension (reference sign W in FIG. 14) of each hollowed portion 56B increases in multiple steps (in the case of FIG. 14, 2 steps) as proceeding from the second end 59 to the first end 58 in the extending direction. The width dimensions of portions on the first end 58 side and the second end 59 side in the extending direction of each hollowed portion 56B are constant. Contrary to this, the width dimension of the intermediate portion in the extending direction of each hollowed portion 56B gradually increases as proceeding from the second end 59 side toward the first end 58. In the case of the third embodiment, similarly to the second embodiment, the strength of the mold can be easily ensured, and the distance between the hollowed portions 56B and the recesses 55 can be adjusted, making it easy to ensure the strength of the cam plate portions 42.

Fourth Embodiment

Figure 15:
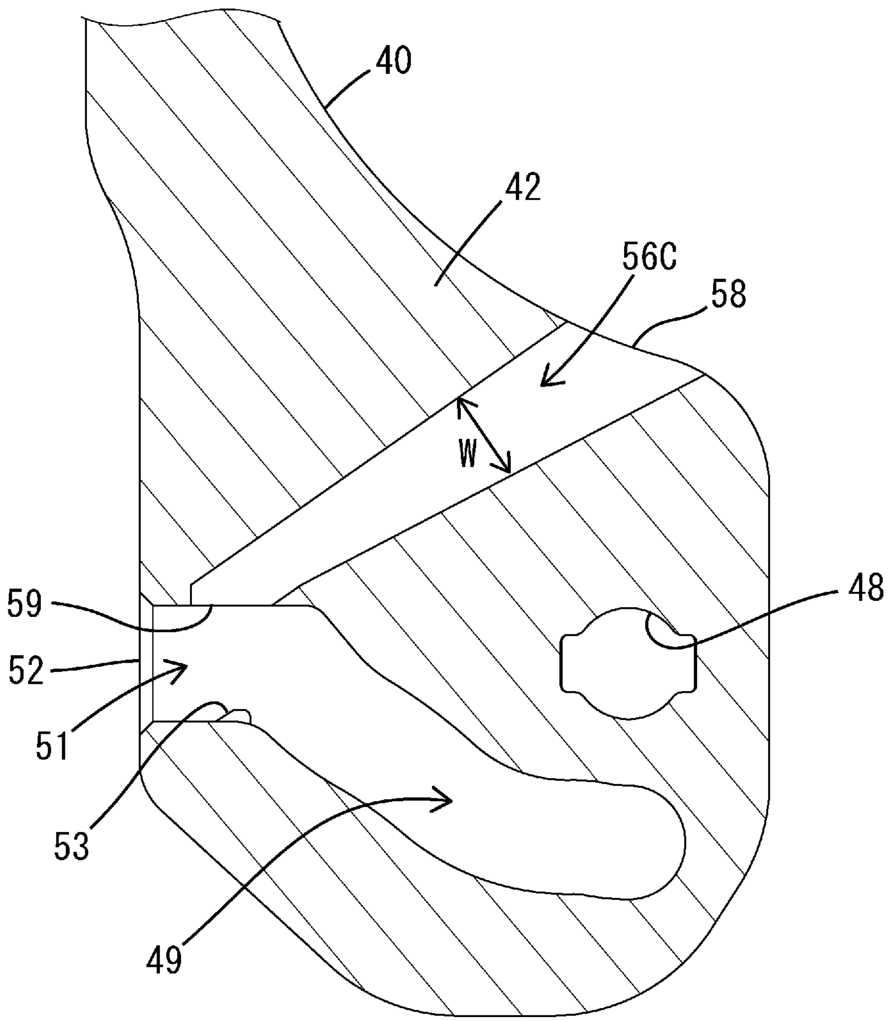
FIG. 15 is a view corresponding to FIG. 8 in a fourth embodiment.

As shown in FIG. 15, the shape of hollowed portions 56C in the lever 40 in the fourth embodiment is different from the first embodiment. Other configurations are similar to the first embodiment.

The width dimension (reference sign W in FIG. 15) of the hollowed portions 56C is, on the whole, gradually increased as proceeding from the second end 59 to the first end 58 in the extending direction. According to the fourth embodiment, the structure of the mold for forming the lever 40 and the hollowed portions 56C can be simplified, and in addition to that, the mold releasing property can be further improved.

Other Embodiments of the Present Disclosure

The first to fourth embodiments disclosed herein are exemplary in all respects and should be construed as being not limitative.

In the first to fourth embodiments, the lever 40 is a rotation lever that rotates between the temporary lock position and the lock position with respect to the housing 20. Contrary to this, according to the other embodiments, the lever may be a slidable lever that slidingly and linearly moves between the temporary lock position and the lock position with respect to the housing.

In the first to fourth embodiments, the lever 40 has a bridge-like plate shape having the coupling portion 41 and the pair of cam plate portions 42 (not shown in the second to fourth embodiments). Contrary to this, in the other embodiments, the lever may be formed by a single plate that is constituted by a single cam plate portion.

In the first to fourth embodiments, the hollowed portions 56, 56A, 56B, and 56C have a rectangular closed loop-like cross section at the intermediate portions in the thickness direction of the cam plate portions 42 (not shown in the second to fourth embodiments). Contrary to this, in the other embodiments, the hollowed portions may have an oval cross section, preferably an oval closed loop-like cross section in the surface direction, at intermediate portions in the thickness direction of the cam plate portions.

In the first to fourth embodiments, the cam grooves 49 are open in the inner surfaces of the cam plate portions 42 and closed on the outer surface side of the cam plate portions 42. Contrary to this, in the other embodiments, the cam grooves may be open in the inner and outer sides and extend through the cam plate portions in the thickness direction.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a housing that can be fitted to a partner connector; and a lever disposed so as to be displaceable between a temporary lock position and a lock position with respect to the housing, wherein the lever has a plate-shaped cam plate portion that is to engage with the partner connector, and is configured to promote fitting with the partner connector in a process of displacement from the temporary lock position to the lock position, and the cam plate portion includes:

a locking portion that protrudes from a first end portion in a thickness direction of the cam plate portion in the thickness direction and is locked by the housing at the temporary lock position; and a hole-shaped hollowed portion disposed on an opposite side to the locking portion with respect to the first end portion in the thickness direction, at an intermediate portion in the thickness direction.

2. A connector according to claim 1, wherein the hollowed portion extends in the intermediate portion in the thickness direction, and a first end in an extending direction of the hollowed portion is open in a thickness surface of an outer periphery of the cam plate portion.

3. The connector according to claim 2, wherein the lever includes a lock arm that is to be locked by the housing or the partner connector at the lock position, and the lock arm extends in a direction parallel to the extending direction of the hollowed portion.

4. The connector according to claim 2, wherein the cam plate portion includes a cam groove that extends from an inlet that is open in the thickness surface of the outer periphery of the cam plate portion, the cam groove is configured to receive a cam pin of the partner connector from the inlet at the temporary lock position, and cause the cam pin to fit to a groove surface in the process of displacement, the first end portion in the thickness direction of the cam plate portion defines the inlet side of the cam groove, and a second end in the extending direction of the hollowed portion is open on the inlet side of the groove surface of the cam groove.

5. The connector according to claim 2, wherein a dimension in a width direction orthogonal to the extending direction of the hollowed portion and the thickness direction is larger on the second end side in the extending direction than on the first end side in the extending direction.

* * * * *